United States Patent
Sigler

(10) Patent No.: US 9,509,194 B2
(45) Date of Patent: Nov. 29, 2016

(54) GENERATOR ASSEMBLY

(71) Applicant: GE Aviation Systems LLC, Grand Rapids, MI (US)

(72) Inventor: Charles T. Sigler, Englewood, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 311 days.

(21) Appl. No.: 14/149,267

(22) Filed: Jan. 7, 2014

(65) Prior Publication Data

US 2015/0194862 A1   Jul. 9, 2015

(51) Int. Cl.
*H02K 9/19* (2006.01)
*H02K 9/22* (2006.01)
*H02K 5/20* (2006.01)

(52) U.S. Cl.
CPC ....... *H02K 9/22* (2013.01); *H02K 5/20* (2013.01); *H02K 9/19* (2013.01)

(58) Field of Classification Search
CPC ............. H02K 9/22; H02K 9/19; H02K 5/00; H02K 5/20; H02K 1/02
See application file for complete search history.

(56) References Cited

U.S. PATENT DOCUMENTS

| | | | | |
|---|---|---|---|---|
| 3,336,553 A | * | 8/1967 | Cripps | H02K 3/44 219/670 |
| 6,744,158 B2 | * | 6/2004 | Liang | H02K 9/22 310/43 |
| 9,076,581 B2 | * | 7/2015 | Piascik | H01F 5/04 |
| 2008/0042502 A1 | * | 2/2008 | VanLuik | H02K 1/32 310/89 |
| 2008/0061637 A1 | | 3/2008 | Gamble et al. | |
| 2009/0042013 A1 | | 2/2009 | Finter et al. | |
| 2012/0112571 A1 | * | 5/2012 | Stephens | H02K 11/0005 310/55 |
| 2013/0209239 A1 | | 8/2013 | Karlsson et al. | |

FOREIGN PATENT DOCUMENTS

| | | |
|---|---|---|
| CA | 2525351 A1 | 5/2006 |
| EP | 0419124 B1 | 5/1994 |

OTHER PUBLICATIONS

Non-Final Office Action issued in connection with related U.S. Appl. No. 14/171,858 on Mar. 10, 2016.

* cited by examiner

*Primary Examiner* — Joshua Benitez-Rosario
*Assistant Examiner* — Leda Pham
(74) *Attorney, Agent, or Firm* — GE Global Patent Operation; William S. Munnerlyn

(57) ABSTRACT

An electric machine, such as a generator, providing for the generation of electricity and includes a rotor generating a magnetic field and a stator having stator windings. The interaction of the magnetic field with the stator windings generates current in the windings. The generator may provide the generated current to a power output of the generator, where it may be further transmitted to an electrical load to power the load.

14 Claims, 5 Drawing Sheets

US 9,509,194 B2

GENERATOR ASSEMBLY

BACKGROUND OF THE INVENTION

Electric machines, such as generators, provide for the generation of electricity from a mechanical force. The generation of the electricity occurs due to the interaction of a rotating magnetic field in relation to a set of conductive windings. In one generator example, a rotor rotated by a mechanical force may generate the rotating magnetic field relative to a stationary stator having a set of conductive windings. The interaction generates a current in the stator windings, which may be provided to the power output of the generator, where it may be further transmitted to power an electrical load.

BRIEF DESCRIPTION OF THE INVENTION

In one aspect, a generator assembly includes a stator having a core with multiple poles, stator windings wound about the poles to define winding end turns at an end of the poles, a heat transfer element having a body defining a face confronting the end turns and comprising an aluminum alloy including a predetermined amount of Silicon Carbide (SiC) providing the body with a first coefficient of thermal expansion, and a thermally conductive, dielectric coating deposited on at least a portion of the face of the heat transfer element and in physical contact with the stator windings, and having a second coefficient of thermal expansion. The predetermined amount of SiC is selected such that the first and second coefficients of thermal expansion are close enough that the thermal expansion of the heat transfer element and the dielectric coating in response to exposure to heat from the end turns will not result in through cracking of the dielectric coating during normal operation of the generator.

DESCRIPTION OF EMBODIMENTS OF THE INVENTION

The invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, the invention is applicable in any environment using an electric machine.

Figure 1:
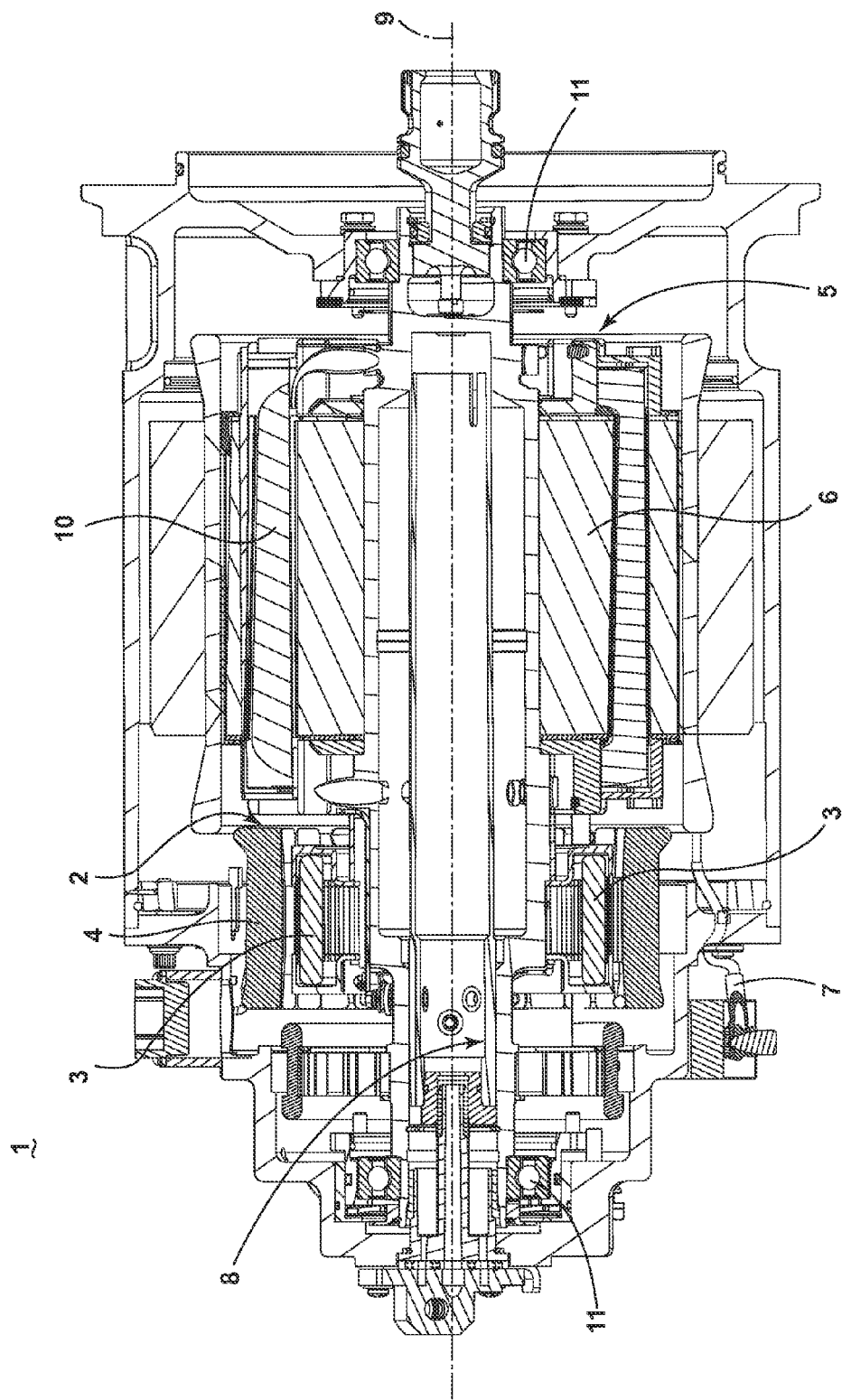
FIG. 1 is a sectional view of an electrical machine assembly.

FIG. 1 illustrates an electric machine assembly, such as a generator 1, comprising a first machine 2 having an exciter rotor 3 and an exciter stator 4, and a synchronous second machine 5 having a main machine rotor 6 and a main machine stator 10. At least one power connection is provided on the exterior of the generator 1 to provide for the transfer of electrical power to and from the generator 1. Power is transmitted by this power connection, shown as an electrical power cable 7, directly or indirectly, to the electrical load and may provide for a three phase with a ground reference output from the generator 1.

The generator 1 further comprises a rotatable shaft 8 mechanically coupled to a source of axial rotation, which may be a gas turbine engine, about an axis of rotation 9. The rotatable shaft 8 is supported by spaced bearings 11. The exciter rotor 3 and main machine rotor 6 are mounted to the rotatable shaft 8 for rotation relative to the stators 4, 10, which are rotationally fixed within the generator 1. The stators 4, 10 may be mounted to any suitable part of a housing portion of the generator 1. The rotatable shaft 8 is configured such that mechanical force from a running turbine engine provides rotation to the shaft 8. Alternatively, in the example of a starter/generator, rotation of the rotatable shaft 8 of the generator 1 during a starting mode produces a mechanical force that is transferred through the shaft 8 to provide rotation to the turbine engine.

Figure 2:
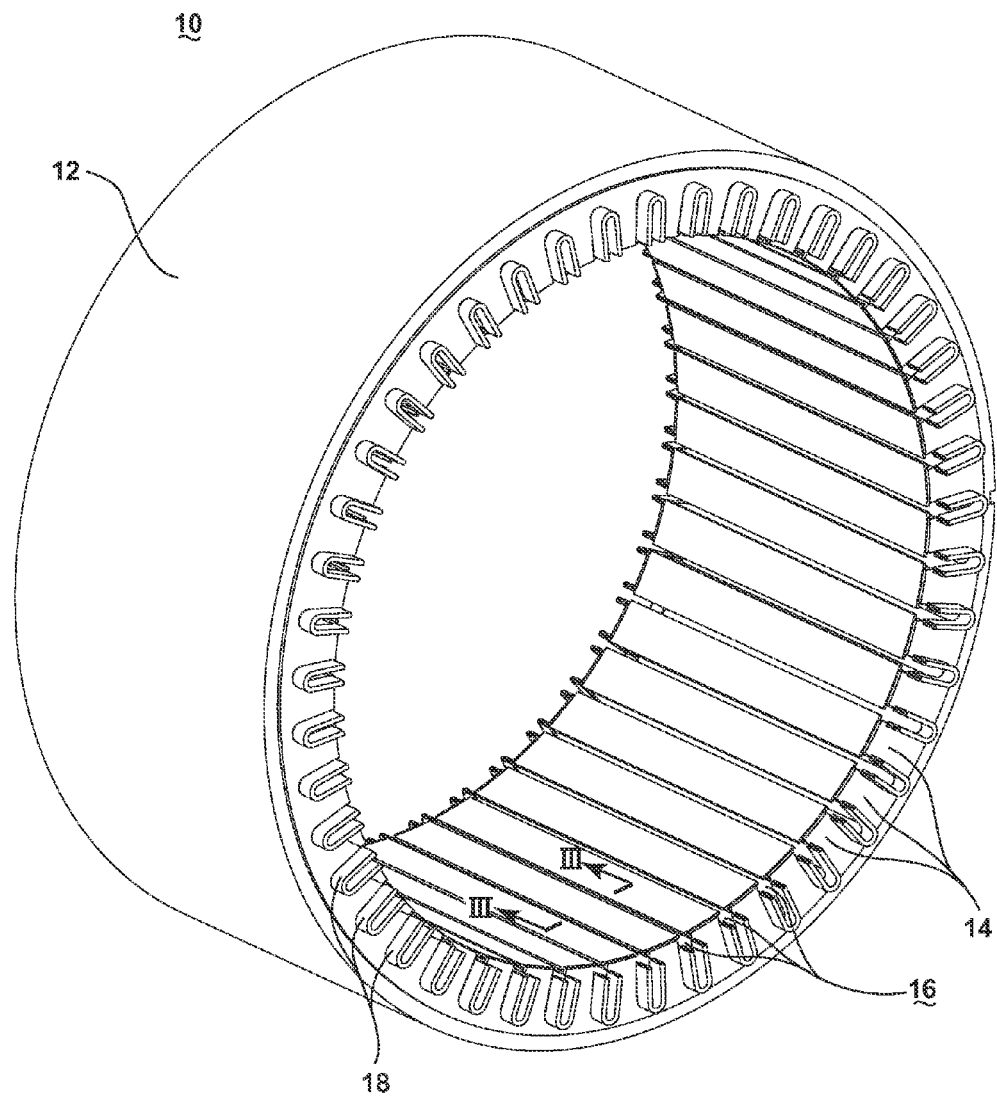
FIG. 2 is a perspective view illustrating a stator of an electric machine according to the first embodiment of the invention.

FIG. 2 illustrates the stator 10 in greater detail. The stator 10, as shown, comprises a generally cylindrical core 12, a plurality of posts 14, at least one winding slot 16, and may optionally include at least one slot liner 18 provided for at least some of the winding slots 16. The surface at the inner perimeter of the core 12 faces the rotor 6 and has a plurality of spaced posts 14 defining a corresponding plurality of spaced winding slots 16 therebetween, radially arranged at a predetermined spacing in the circumferential direction. Each of the plurality of winding slots 16 are configured with an open top facing the circumferential center point of the core 12 and may terminate in opposing open ends spaced axially along the core 12. For instance, the ends of the winding slot 16 may axially terminate at the same length as the core 12. A slot liner 18 is placed along the inner perimeter of the winding slot 16 defining an open top facing the circumferential center point of the core 12 and terminating in opposing ends which are shown extending beyond the winding slot 16 open ends. Alternatively, the slot liner 18 terminating ends may not extend beyond the winding slot 16 open ends. The core 12 may be formed from a plurality of laminations, but alternate forming or machining of materials is envisioned.

Figure 3:
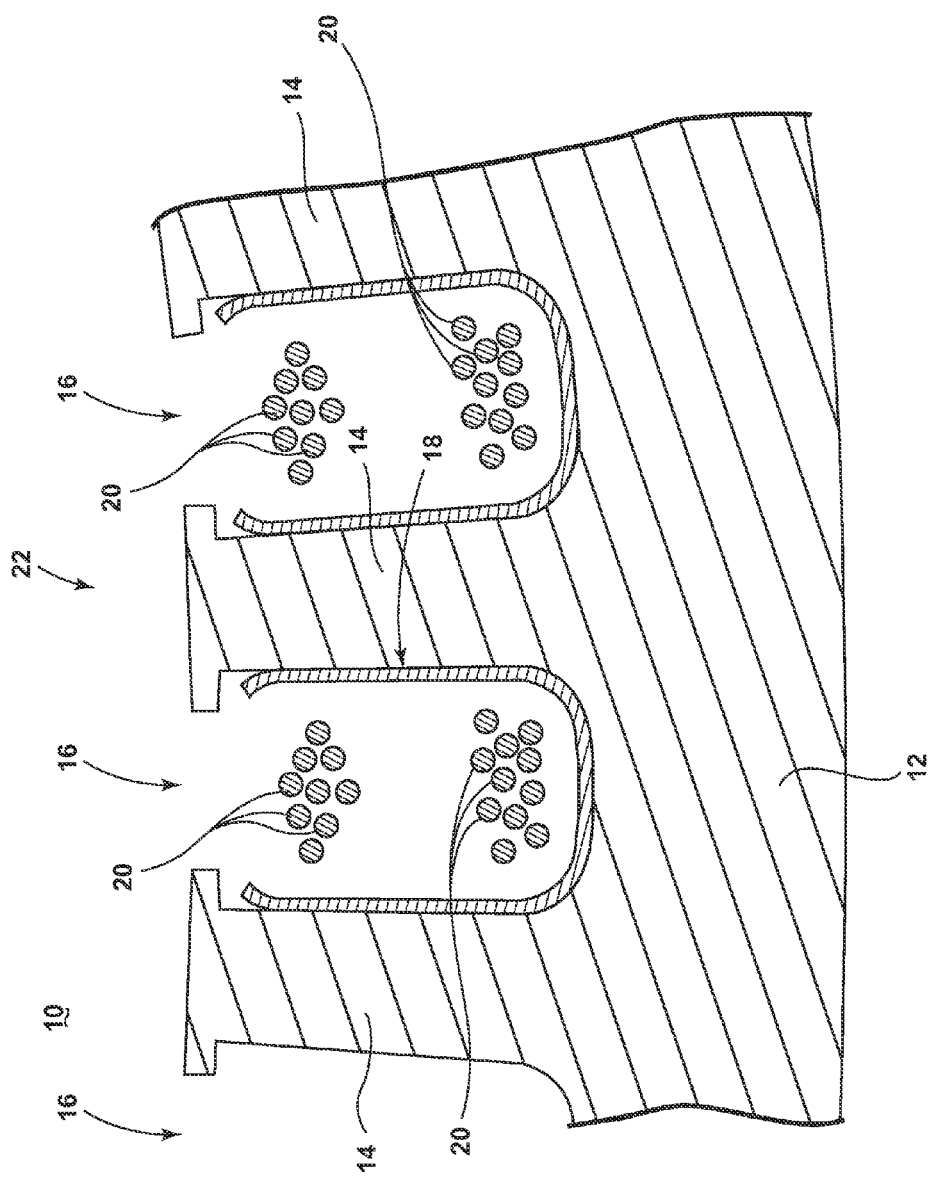
FIG. 3 is a partial sectional view taken along line III-III of FIG. 2 showing a winding slot and slot liner according to the first embodiment of the invention.

FIG. 3 illustrates a sectional view of a configuration of a single winding slot 16 assembled stator 10 having stator windings 20 according to one embodiment of the invention. The stator windings 20 comprise conductive wires (only a few are shown, not to scale, for illustrative purposes) that are wound about the core 12 within the winding slot 16 such that individual sets of windings 20 may be separated from other sets of windings 20 found in adjacent slots 16. Additionally shown, the slot liner 18 isolates the plurality of stator windings 20 from the plurality of posts 14 and the stator core 12. While only one set of stator windings 20 are shown, it is envisioned that at least one set of windings 20 is wound around the axial ends of at least two posts 14 (henceforth, "end turns") and through at least two adjacent winding slots 16 such that the energization of the windings 20 form a magnetic pole 22 at the intervening post 14. The rotation of a magnetic field at the rotor 6 generates a corresponding voltage in the stator windings 20 at the corresponding poles 22.

Figure 4:
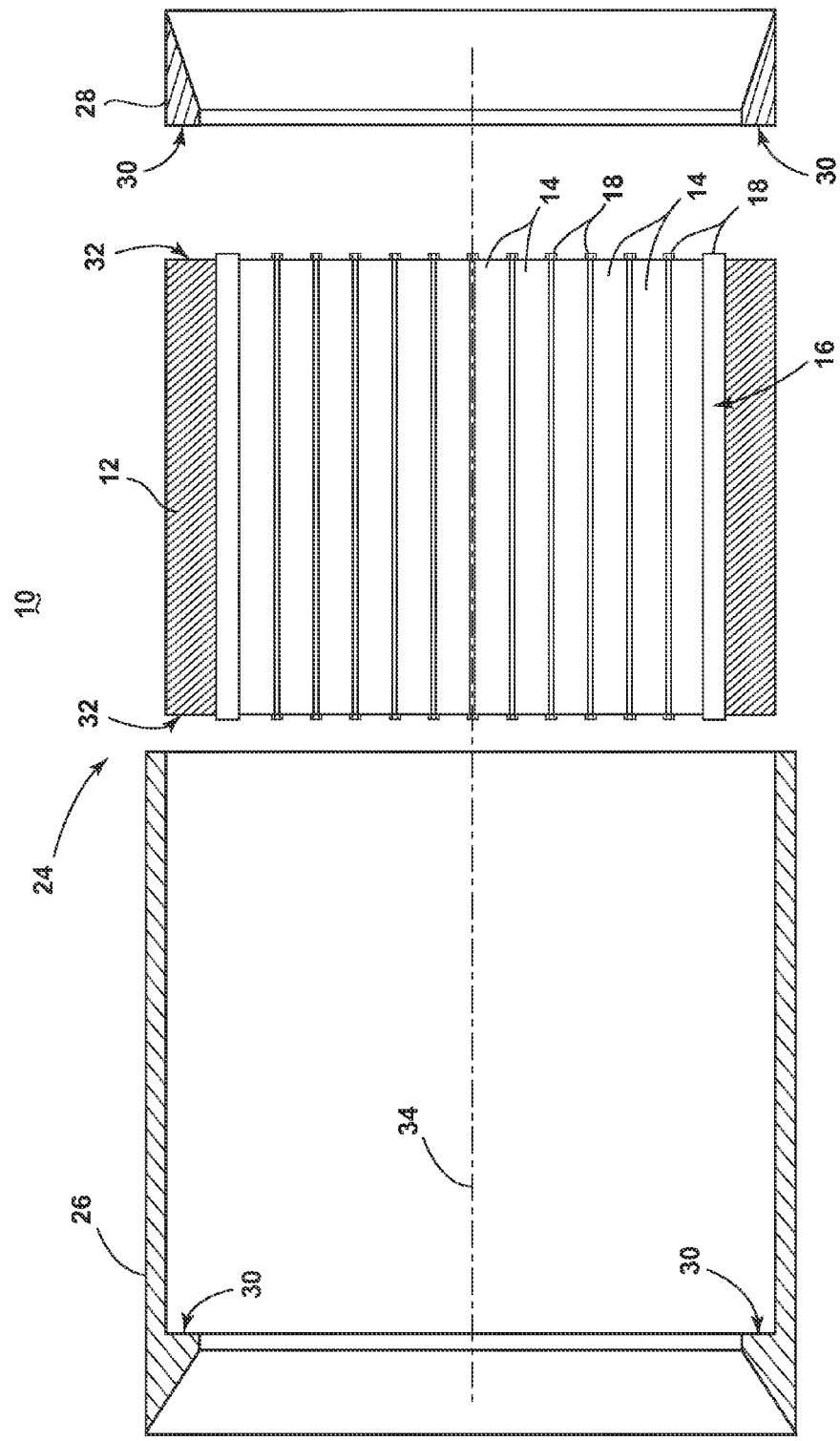
FIG. 4 is an exploded view taken from a surface paralleling with and going through the axis of the stator, showing the stator assembly according to the first embodiment of the invention.

FIG. 4 illustrates an exploded view of the stator 10 of the generator 1 taken from the longitudinal axis of the stator 10. As shown, the stator 10 may further comprise a stator assembly 24 having a heat transfer element in physical contact with the stator 10 such that heat may be transferred from the core 12 to the stator assembly 24. In the illustrated example, the heat transfer element may comprise a first body element 26 configured in a ring to encircle and receive the stator core 12, and a second body element 28 also configured in a ring, and encircled and received by the first body element 26. Each of the first and second body elements 26, 28 further define at least one abutting face 30 configured to abut a respective axial terminating end 32 of the core 12.

Each of the first and second body elements 26, 28 may comprise a thermally conductive material, for example, an aluminum alloy having a predetermined amount of silicon carbide having a first coefficient of thermal expansion (CTE) according to the material properties. In one example, an aluminum alloy having a 30% reinforcement of SiC (by volume) may have a CTE of 14.0 ppm/° Celsius (° C.) between an operating temperature of 21-100° C. This example may further include a thermal conductivity of 165 Watts per meter-Kelvin at 21° C. While one example of an aluminum alloy having a 30% SiC is provided, alternative heat transfer elements, such as aluminum alloys having different predetermined amounts of SiC, are envisioned.

The stator assembly 24 is configured such that the first body element 26, stator core 12, and second body element 28 may be fixedly or removably assembled, for example, by axially aligning each component 26, 12, 28 along a common axis 34, and inserting the core 12 into the first body element 26, followed by inserting the second body element 28 into the first body element 26, such that the abutting face 30 of each first and second body elements 26, 28 abuts the core ends 32 of the core 12.

Figure 5:
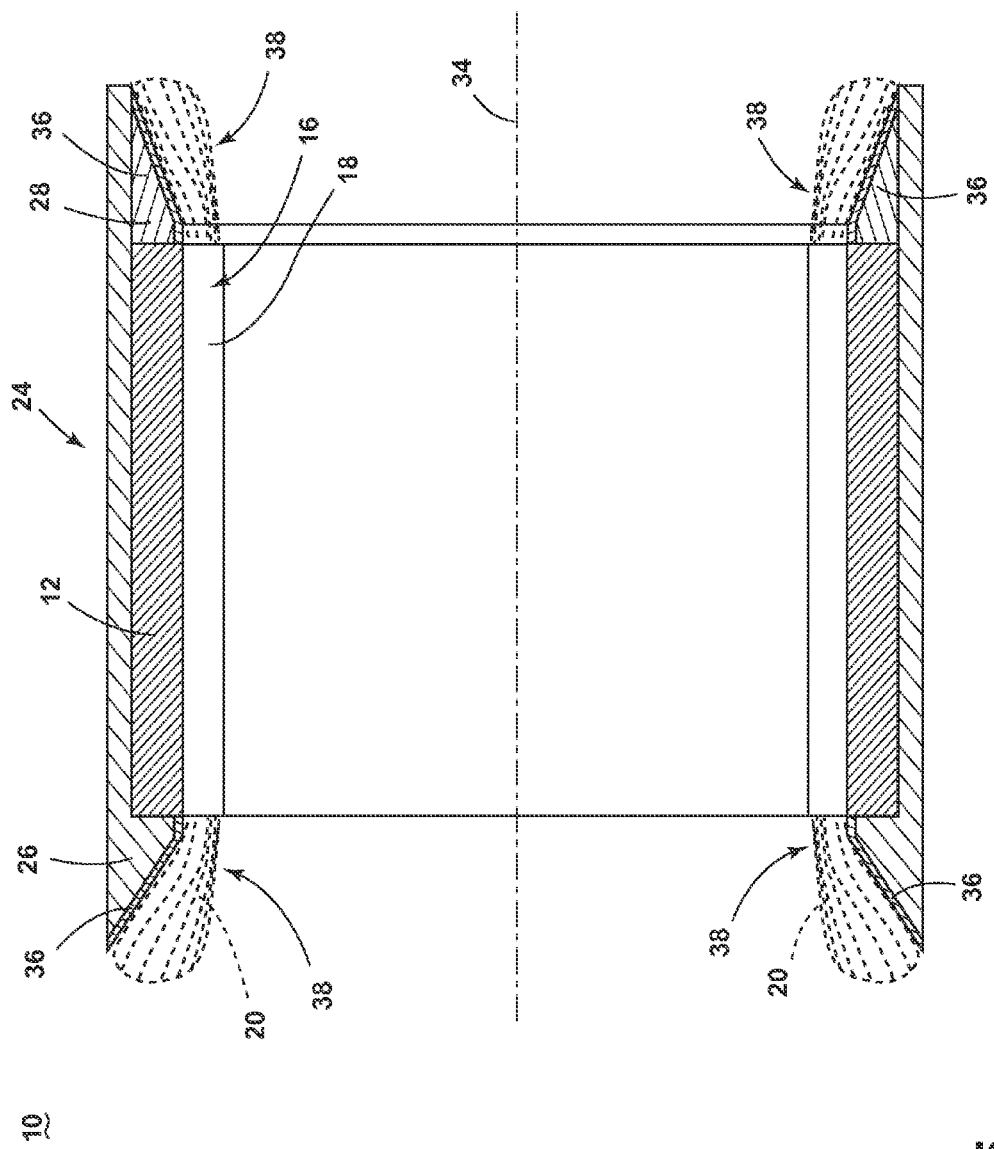
FIG. 5 is an assembled view of the embodiment of FIG. 4.

FIG. 5 illustrates a cross-sectional view of an assembled stator assembly 24. As shown, the stator assembly 24 may further comprise a thermally conductive, dielectric coating 36 deposited on at least a portion of a face of the first and/or second body elements 26, 28. The coating 36 may be applied prior to or after assembling the stator assembly 24. Additionally shown are at least a portion of the stator windings 20 end turns 38 axially extending outside the core 12 and slot liner 18 as they wind about the poles 22. It is envisioned that the stator windings 20 and/or end turns 38 are in physical and/or thermal contact with the first and/or second body elements 26, 28, via the coating 36, such that the elements 26, 28 and coating 36 provide heat transfer between the materials and/or layers. Additionally, the dielectric properties of the coating 36 electrically isolate the stator windings 20 from the stator core 12 and the first and/or second body elements 26, 28.

The coating 36 may be adhered or deposited on to the first and second body elements 26, 28 through a number of techniques, for example, by including adhesives, plasma coating, or spray-on coating. Additional coating 36 adhesion or depositing techniques are envisioned. One example of the coating 36 may include a ceramics-based material, such as aluminum oxide, which has a second CTE, such as 6.3 ppm/° C. between 21-100° C., however alternative conductive, dielectric materials or coatings are envisioned.

During operation of the generator 1, the interaction of the rotating magnetic field with the stator windings 20 of the stator assembly 24 generates a current through the windings 20, which may ultimately be delivered to a generator output or electrical load for operating the load. The current generated in the stator windings 20 generates heat in the windings 20, for example, at the end turns 38. The physical and/or thermal contact between the stator windings 20 and/or end turns 38, the coating 36, and the body elements 26, 28 allows the heat generated in the windings 20 to be thermally conducted through the coating 36 to the body elements 26, 28, where it may be further dissipated, for example, via heat fins, air cooling, or through coolant traversing through a coolant passage in physical and/or thermal contact with the body elements 26, 28. Additional cooling techniques are envisioned.

It is envisioned that the predetermined amount of the SiC of the aluminum alloy is selected such that the first and second coefficients of thermal expansion are close enough that the difference between the thermal expansion of the body elements 26, 28 and the coating 36 will not result in through-cracking of the coating 36 in response to exposure to the heat generated by the end turns 38 of the stator windings 20 during normal operation of the generator 1. Stated another way, the relationship of the SiC of the aluminum alloy is selected so that the thermal expansion of the aluminum alloy is more aligned to the thermal expansion of the coating 36 so that the coating 36 does not crack during thermal expansion. For example, the CTE of the body elements 26, 28 may be higher or lower than the CTE of the coating 36. In the example provided above, the first and second CTE may be within 7.7 units of each other, however any first and second CTE within 10 units of each other are envisioned. In this example, the difference between the first and second CTE is within 55 percent of the first CTE. The descriptions provided are non-limiting examples of possible relationships between the CTE of the body elements 26, 28 and the coating 36, and other relational percentages and/or relational coefficient limits are envisions.

Many other possible embodiments and configurations in addition to that shown in the above figures are contemplated by the present disclosure. For example, one embodiment of the invention contemplates a heat transfer element having additional or fewer body elements configured to abut the stator core 12. Another embodiment envisions configuring the coating 36 on alternative heat transfer element faces, yet still in physical and/or thermal contact with the stator windings 20 or end turns 38. Additionally, the design and placement of the various components may be rearranged such that a number of different in-line configurations could be realized.

The embodiments disclosed herein provide a generator assembly with improved heat dissipation at the stator winding end turns. One advantage that may be realized in the above embodiments is that the above described embodiments have superior thermal and electrical operation over the conventional generator configurations. With the proposed configurations, a high thermal conductivity between the end turns of the stator windings and the heat transfer element can be achieved due to the high thermal conductivity of the heat transfer element and the coating as described above. The higher thermal conductivity allows for a generator that can dissipate higher levels of heat. Since the amount of heat generated in the stator windings is related to the amount of electricity generated, the above-described embodiments allows for an electric machine capable of generating more power than conventional machines.

Additionally, the dielectric strength of the coating layer reduces or eliminates the likelihood of an electrical short between the stator windings and heat transfer element, even at higher current and voltage generation by the electric machine. The combination of higher thermal conductivity and dielectric strength of the embodiments described herein result in a stator assembly which can be used in higher thermal class applications due the improved ability to dissipate heat away from the stator windings. Thus, another advantage of the above described embodiments is that electric machines having the described generator assembly may be driven to generate more power and at higher temperatures than the conventional electric machines.

Furthermore, by providing the heat transfer element with a predetermined amount of silicon carbide, the generator assembly may be configured to provide a closer matching coefficient of thermal expansion between the heat transfer element and the coating. Thus, when the heat transfer element and the coating are heated during the heat dissipation, they may be configured to expand at a similar or closer rate, reducing the likely hood that a disparity in expansion rate may crack the coating. By reducing the likelihood of developing cracks in the coating, the likelihood of developing electrical shorts between the stator windings and the heat transfer element is reduced as well.

In even yet another advantage of the above-described embodiments is that by providing improved heat dissipation of the stator windings, and thus allowing the windings to operate at a lower temperature, as well as including a coating material such as ceramic, which may require less maintenance and a higher mean time between failures, the overall operating life of the generator is improved, and/or the maintenance time and costs of the generator are reduced. When designing electric machine systems, an important factor to address is reliability. Improved operating life, and reduced maintenance time and costs result in competitive advantages.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator assembly comprising:
a stator having a core with multiple poles;
stator windings wound about the poles to define winding end turns at an end of the poles;
a heat transfer element having a body defining a face confronting the end turns and comprising an aluminum alloy including a predetermined amount of Silicon Carbide (SiC) providing the body with a first coefficient of thermal expansion; and
a thermally conductive, dielectric coating deposited on at least a portion of the face of the heat transfer element and in physical contact with the stator windings, and having a second coefficient of thermal expansion;
wherein the predetermined amount of SiC is selected such that the first and second coefficients of thermal expansion are related that the thermal expansion of the heat transfer element and the dielectric coating in response to exposure to heat from the end turns will not result in through-cracking of the dielectric coating during normal operation of the generator.

2. The generator assembly of claim 1 wherein a difference between first and second coefficients of thermal expansion is within 55 percent of the first coefficient of thermal expansion.

3. The generator assembly of claim 1 wherein the first and second coefficients of thermal expansion are within 10 units of each other.

4. The generator assembly of claim 1 wherein the first coefficient of thermal expansion is 14.0 ppm/° Celsius (C) and the second coefficient of thermal expansion is 6.3 ppm/° C.

5. The generator assembly of claim 1 wherein the temperature of the end turns during normal operation is between 200 and 280 degrees C.

6. The generator assembly of claim 5 wherein the generator generates at least 120 kilowatts during normal operation.

7. The generator assembly of claim 4 wherein the amperage of the current through the windings during normal operation is 67 amps.

8. The generator assembly of claim 1 wherein the predetermined amount of SiC is at least 30%, by volume.

9. The generator assembly of claim 1 wherein the thermally conductive coating is a plasma coating.

10. The generator assembly of claim 1 wherein the thermally conductive coating is a spray-on coating.

11. The generator assembly of claim 1 wherein the body further comprises a coolant passage such that coolant traversing through the coolant passage cools the body.

12. The generator assembly of claim 1 wherein the dielectric coating comprises a ceramic.

13. The generator assembly of claim 12 wherein the ceramic comprises aluminum oxide.

14. The generator assembly of claim 12 wherein the ceramic has a coefficient of thermal expansion of 6.3 ppm/° C.

* * * * *